United States Patent [19]

Schwellinger

[11] Patent Number: 4,859,544

[45] Date of Patent: Aug. 22, 1989

[54] WELD FILTER MATERIAL FOR FUSION WELDING OF HIGH STRENGTH ALUMINUM ALLOYS

[75] Inventor: Pius Schwellinger, Tengen, Fed. Rep. of Germany

[73] Assignee: Swiss Aluminium Ltd., Chippis, Switzerland

[21] Appl. No.: 217,680

[22] Filed: Jul. 11, 1988

[30] Foreign Application Priority Data

Jul. 23, 1987 [CH] Switzerland ................. 2807/87

[51] Int. Cl.$^4$ ............................................. B32B 15/00
[52] U.S. Cl. .................................. 428/654; 148/439; 420/532
[58] Field of Search .................. 420/532; 148/439; 428/654

[56] References Cited

U.S. PATENT DOCUMENTS 2,245,167 6/1941 Stroup ................................. 148/439
3,332,773 7/1967 Dudas et al. ........................ 420/541

FOREIGN PATENT DOCUMENTS 0206519 12/1986 European Pat. Off. .
2736484 1/1979 Fed. Rep. of Germany .
2191976 2/1974 France .
2000806 1/1979 United Kingdom .

OTHER PUBLICATIONS

British Welding Journal, Jul. 1961.

Primary Examiner—R. Dean
Attorney, Agent, or Firm—Bachman & LaPointe

[57] ABSTRACT

A weld filler material for fusion welding of high strength aluminum alloys, especially alloys of the AlZnMgCu type, contains
   4.1–6.5% of zinc,
   4.0–6.0% of magnesium,
   0.3–0.6% of copper,
   0.3–0.5% of manganese,
   at most 0.1% of titanium,
   at most 0.3% of chromium,
   at most 0.3% of zirconium,
   at most 0.1% of silicon and
   at most 0.3% of iron,
the remainder being aluminum of commercial purity. The formation of cracks in the region of the weld seam can be prevented by means of the weld filler material.

11 Claims, No Drawings

WELD FILTER MATERIAL FOR FUSION WELDING OF HIGH STRENGTH ALUMINUM ALLOYS

DESCRIPTION

The invention relates to a weld filler material for fusion welding of high strength aluminum alloys, in particular alloys of the AlZnMgCu type.

Welded components of high strength aluminum alloys must meet stringent demands with respect to mechanical strength. Apart from qualitatively good welding, the composition of the weld filler material is also a determining factor. On the one hand, the filler wire materials hitherto used tend to cause heat cracks in the weld metal and, on the other hand, they also cause cracks in the base material immediately adjoining the weld seam, because of their relatively high melting point and the associated large amount of heat introduced. Both types of cracks cause a deterioration of the properties of the welded joint to such an extent that use in load-bearing welded structures is not possible.

German Patent Specification No. 2,736,484 has disclosed a weld filler material consisting essentially of
1-4% of zinc,
2-5% of magnesium
0.2-0.5% of copper and
0.3-0.5% of manganese,
the remainder being aluminum.

However, use of this material for fusion welding of high strength aluminum alloys cannot prevent the formation of cracks in the weld seam zone.

In the light of these facts, it was the object of the present invention to provide a weld filler material which is suitable for fusion welding of high strength aluminum alloys and by means of which the tendency to form cracks in the region of the weld seam can be suppressed.

According to the invention, the object is achieved by a weld filler material of the following composition:
4.1-6.5% of zinc,
4.0-6.0% of magnesium,
0.3-0.6% of copper,
0.3-0.5% of manganese,
at most 0.1% of titanium,
at most 0.3% of chromium,
at most 0.3% of zirconium,
at most 0.1% of silicon and
at most 0.3% of iron,
the remainder being aluminum of commercial purity.

For the individual elements, the following content ranges have proved to be preferred:
4.8-5.3% of zinc,
4.3-5.3% of magnesium,
0.45-0.55% of copper
0.35-0.45% of manganese,
at most 0.15% of chromium,
at most 0.15% of zirconium and
at most 0.10% of iron.

An alloy which is especially suitable as a weld filler material for fusion welding of AlZnMgCu alloys has the following composition:
4.9-5.3% of zinc,
4.5-5.1% of magnesium,
0.45-0.55% of copper,
0.35-0.45% of manganese,
at most 0.10% of titanium,
at most 0.15% of chromium,
at most 0.15% of zirconium,
at most 0.10% of silicon and
at most 0.10% of iron,
the remainder being aluminum of commercial purity.

All the content data concerning the composition of the weld filler material relates to percent by weight.

The weld filler material according to the invention is normally used in the form of wire and is suitable for all types of fusion welding processes.

The advantages of the weld filler material according to the invention is demonstrated below by reference to an illustrative example.

EXAMPLE 8 mm thick sheets of aluminum alloy with 5.6% of zinc, 2.6% of magnesium, 1.6% of copper, 0.16% of manganese, 0.18% of chromium, 0.01% of titanium, 0.20% of iron and 0.06% of silicon were welded by the TIG plasma keyhole welding method, using a filler wire having the composition of 5.2% of zinc, 4.8% of magnesium, 0.55% of copper, 0.40% of manganese, 0.10% of titanium, 0.10% of chromium, 0.04% of silicon and less than 0.10% of iron, the remainder being aluminum. The welded sheets were divided up and the individual weld specimens were subjected to different age-hardening conditions. The subsequent fracture test caused in none of the cases a fracture at the weld seam boundary or in the weld metal, but always gave a displacement of the position of fracture into the region of the base metal.

Metallographic examinations of the welded joints have confirmed that the formation of cracks in the region of the weld seam can be prevented by the weld filler material according to the invention.

I claim:

1. A filler wire for fusion welding of high strength aluminum alloys, especially alloys of the AlZnMgCu type, said filler material consisting essentially of 4.1-6.5% of zinc, 4.0-6.0% of magnesium, 0.3-0.6% of copper, 0.3-0.5% of manganese, at most 0.1% of titanium, at most 0.3% of chromium, at most 0.3% of zirconium, at most 0.1% of silicon and at most 0.3% of iron, balance essentially aluminum wherein zinc is present in an amount greater than or equal to magnesium, said filler material characterized by the tendency to suppress cracks in the region of the weld seam.

2. A filler wire according to claim 1 containing 4.8-5.3% of zinc.

3. A filler wire according to claim 1 containing 4.3-5.3% of magnesium.

4. A filler wire according to claim 1 containing 0.45-0.55% of copper.

5. A filler wire according to claim 1 containing 0.35-0.45% of manganese.

6. A filler wire according to claim 1 containing at most 0.15% of chromium.

7. A filler wire according to claim 1 containing at most 0.15% of zirconium.

8. A filler wire according to claim 1 containing at most 0.10% of iron.

9. A filler wire according to claim 1 containing 4.9-5.3% of zinc, 4.5-5.1% of magnesium, 0.45-0.55% of copper, 0.35-0.45% of manganese, at most 0.10% of titanium, at most 0.15% of chromium, at most 0.15% of zirconium, at most 0.10% of silicon and at most 0.10% of iron, the remainder being aluminum of commercial purity.

10. A filler wire according to claim 1 in the form of wire.

11. A fusion welded assembly comprising alloys of the AlZnMgCu type and a filler material consisting essentially of 4.1–6.5% of zinc, 4.0–6.0% of magnesium, 0.3–0.6% of copper, 0.3–0.5% of manganese, at most 0.1% of titanium, at most 0.3% of chromium, at most 0.3% of zirconium, at most 0.1% of silicon and at most 0.3% of iron, balance essentially aluminum, said filler material characterized by the tendency to suppress cracks in the region of the weld seam.

* * * * *